Sept. 10, 1968 C. JONES 3,400,939
OIL SEAL CONSTRUCTION FOR ROTARY ENGINES
Filed Jan. 3, 1966 4 Sheets-Sheet 1

INVENTOR
CHARLES JONES
BY
ATTORNEY

Sept. 10, 1968   C. JONES   3,400,939
OIL SEAL CONSTRUCTION FOR ROTARY ENGINES
Filed Jan. 3, 1966   4 Sheets-Sheet 3

INVENTOR
CHARLES JONES
BY
ATTORNEY

Sept. 10, 1968          C. JONES          3,400,939
OIL SEAL CONSTRUCTION FOR ROTARY ENGINES
Filed Jan. 3, 1966          4 Sheets-Sheet 4
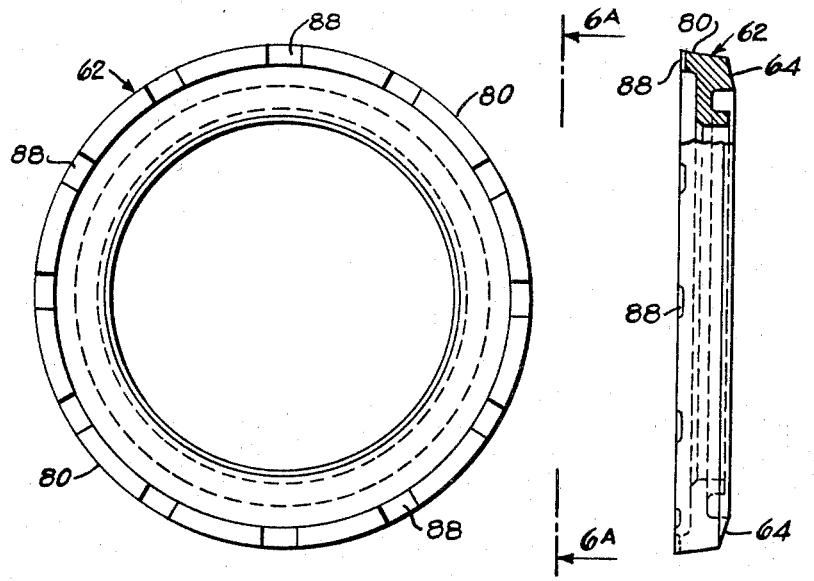
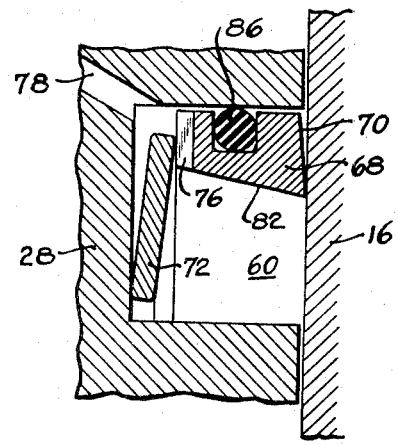
INVENTOR
CHARLES JONES
BY
ATTORNEY United States Patent Office 3,400,939
Patented Sept. 10, 1968

3,400,939
OIL SEAL CONSTRUCTION FOR
ROTARY ENGINES
Charles Jones, Hillsdale, N.J., assignor to Curtiss-Wright
Corporation, a corporation of Delaware
Filed Jan. 3, 1966, Ser. No. 518,301
13 Claims. (Cl. 277—59)

ABSTRACT OF THE DISCLOSURE

A dual-ring oil sealing construction for rotary engines, the dual rings and associated apparatus being borne in the end faces of the rotor in grooves coaxial therewith and sealing between the rotor and the end walls of the housing, with provision for draining the oil from the annular space between the seal rings.

---

This invention relates to oil seal constructions and is particularly directed to a novel and improved dual oil seal construction which preferably has use with rotary combustion engines or the like.

The present invention is preferably embodied in a rotary combustion engine of the Wankel type and is directed to an improvement in oil sealing constructions such as that illustrated in United States Patent No. 3,180,563, issued on Apr. 27, 1965. It should be understood, however, that although the invention is preferably described as embodied in a rotary combustion engine or the like, it is not intended that the invention be so limited.

It is well known in the internal combustion engine art that it is desirable to prevent the lubricating oil from leaking into the zone of the engine wherein combustion gases are present so that the oil does not cause a fouling of the combustion process. Further, oil leakage is undesirable in that it tends to increase the oil consumption of the engine. In rotary combustion engines of the type described herein, the oil seal, which is normally mounted in a rotor end wall, traces an epitrochoidal path along with the rotor and has a planetary motion relative to the outer body as well as a rotary motion along with the rotor. The oil seals must be capable of relative movement within the oil seal groove supporting said oil seals in order to maintain sealing contact with the sealing surfaces of the housing end walls during the complex motion of the rotor relative to said housing. It is therefore a prime purpose of the present invention to provide a novel and improved oil seal construction which is effective for maintaining sealing contact during motion of the rotor relative to the outer body and provides minimum oil leakage past the oil seal construction.

The invention is preferably carried out by providing a dual oil seal construction in each oil seal groove of the rotor for the rotary combustion engine, which dual oil seal construction comprises a first annular oil seal ring which is disposed in a bottom portion of the groove and has substantially scraping edge contact with an inner face of an adjacent outer body end wall. A second oil seal ring is radially spaced from the first oil seal ring and is disposed adjacent the upper groove wall of the seal groove and is likewise disposed in scraping edge contact with the inner face of an outer body end wall. Each of the oil seal rings is provided with a Belleville-type spring which provides an axial spring force component for maintaining each of the seal rings in sealing contact with the inner face of the adjacent outer body end wall during relative movement of the rotor.

As will be explained hereinafter, the use of a Belleville-type spring in combination with the oil seal rings of the invention has particular advantages in bringing about the desired result of the invention. It has been found that the sealing construction of the invention is relatively highly efficient and results in substantially no oil leakage past the oil seals in the direction of the working chambers. However, in some cases it is desirable to permit a small amout of oil leakage to provide a film of lubricating oil between the rotor end wall and the outer body end walls. It may also be desirable to permit a relatively small amount of leakage into the working chambers to aid in lubricating the apex seals which are in rubbing contact with the inner surface of a peripheral wall of the engine, particularly during high speed operation. Therefore, means may be provided in one form of the invention for permitting a controlled amount of leakage past the oil seal construction for accomplishing these latter mentioned purposes.

Accordingly, it is one object of the invention to provide a novel and improved oil seal construction for internal combustion engines or the like.

It is another object of the invention to provide a novel and improved dual oil seal construction for a rotary combustion engine or the like.

It is a further object of the invention to provide a novel and improved oil seal construction for a rotary combustion engine which is highly efficient in preventing oil leakage past said seal means.

It is an additional object of the invention to provide a novel and improved oil seal construction for a rotary combustion engine or the like wherein means are provided for permitting controlled leakage of oil past the oil seal means to satisfy lubrication requirements.

Other objects and advantages of the invention will become apparent upon reading the following detailed description with the accompanying drawings wherein:

FIG. 6 is a plan view of the other of the oil seal rings used in the present invention;

FIG. 6A is an end view of the seal ring of FIG. 6 taken along line 6A—6A; and

FIG. 7 is a sectional view of another embodiment of the invention.

Figure 1:
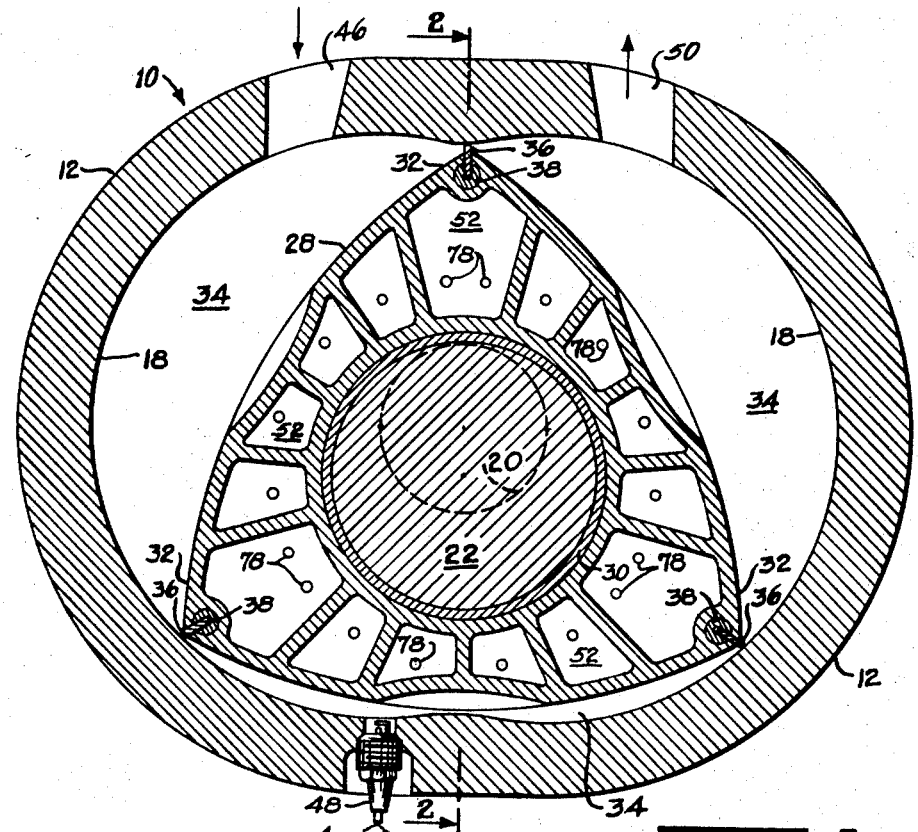
FIG. 1 is a sectional view of a rotary combustion engine of the type embodying the present invention taken along line 1—1 of FIG. 2.
Figure 2:
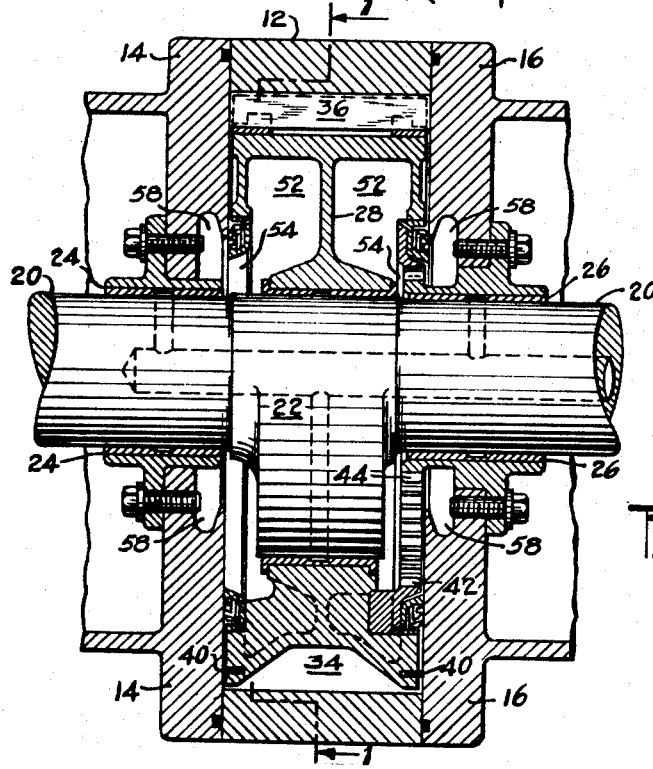
FIG. 2 is an axial sectional view of a rotary combustion engine taken along line 2—2 of FIG. 1.

Referring to FIGS. 1 and 2, there is shown therein a rotary combustion engine having an outer body 10 including a peripheral wall 12, a pair of end walls 14 and 16 connected to said peripheral wall 12 to form a cavity. As shown in FIG. 1, the inner surface 18 of the peripheral wall 12 has a profile which is preferably basically a two-lobed epitrochoid. A shaft 20 having an eccentric portion 22 is supported in the outer body by suitable bearings such as shown at 24 and 26. A piston or more particularly a triangular-shaped rotor 28 is supported for rotation on the eccentric portion 22 by a bearing 30, which rotor 28 has a plurality of apex portions 32 which are disposed in sealing engagement with the inner surface 18 of the peripheral wall 12. As further shown in FIG. 1, a plurality of working chambers 34 are formed between the inner surface of the peripheral wall 12 and the outer surface of the rotor 28, which working chambers, during relative rotation of the rotor and outer body, vary in volume. Seal strips 36 are disposed in grooves in each apex portion 32 of the rotor 28 to maintain sealing engagement between said rotor and the inner surface 18 of the peripheral wall. The seal strips 36 mate with intermediate seal strips 38 in the grooves in each apex portion of the rotor which in turn mate with gas seals 40 disposed in each end wall of the rotor 28 so that the apex seal strips 36, the intermediate seals 38, and the gas seals 40 form a continuous seal for each of the working chambers 34.

An internally toothed gear 42 is supported for rotation with the rotor 28 and mates with a fixed externally toothed gear 44 which gears 42 and 44 serve to maintain the ratio of rotation between the rotor and the shaft 20. In the embodiment illustrated having a two-lobed epitrochoid and a three-lobed rotor, the ratio of rotation of the shaft eccentric with respect to the rotor is 3:1 wherein for each rotation of the rotor about its axis the eccentric shaft rotates three times around its axis. However, it should be understood that the invention is not limited to the embodiment illustrated having a two-lobed cavity and a three-lobed rotor. An intake port 46 is preferably provided in the peripheral wall 12 for admitting air and/or a fuel-air mixture, an ignition means 48 may be provided for igniting the mixture and an exhaust port 50 is provided in the peripheral wall 12 for expelling the burnt gases so that the stages of intake, compression, and expansion may be carried out.

Figure 3:
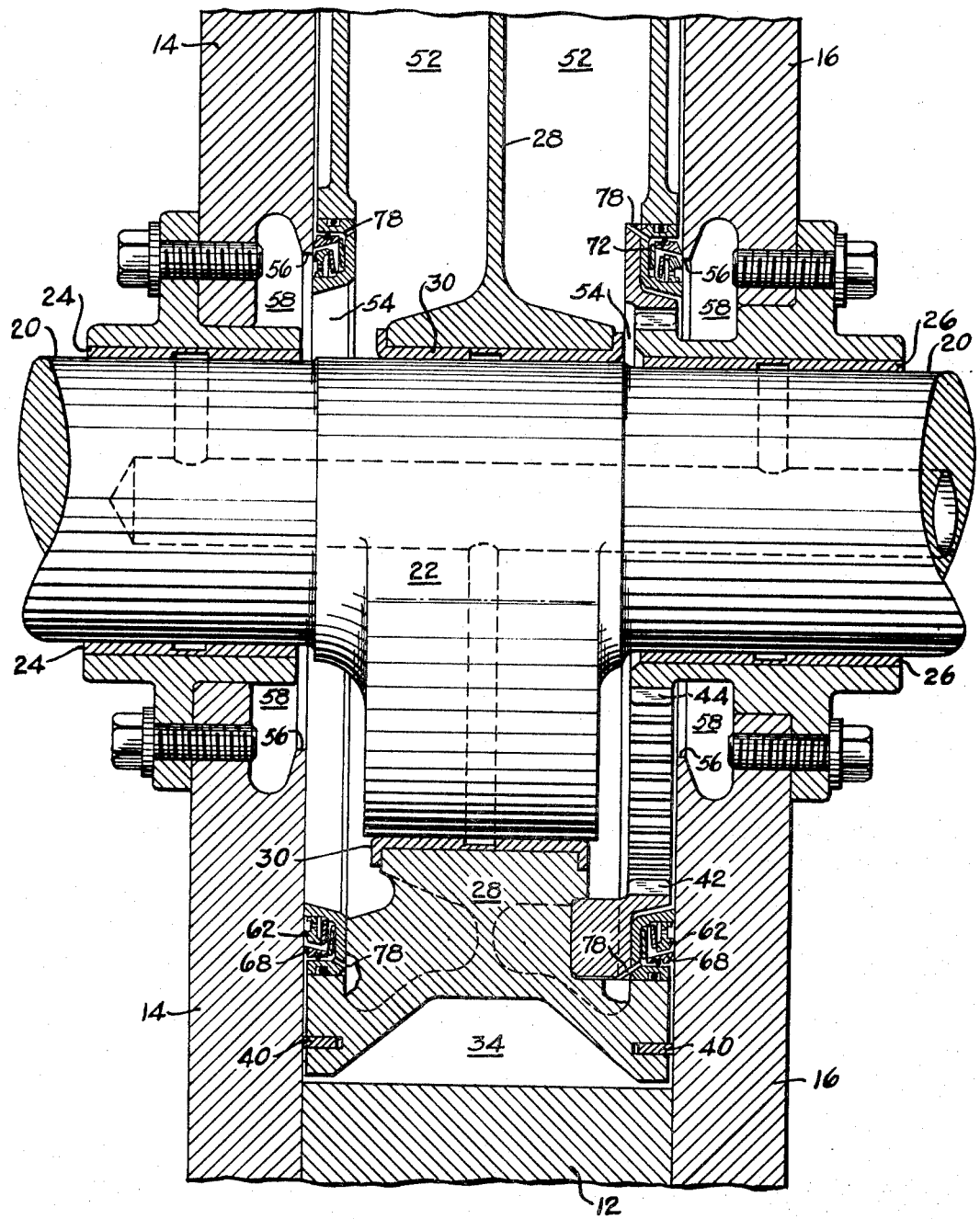
FIG. 3 is an enlarged axial sectional view similar to that of FIG. 2 and illustrating the invention.

The rotor or piston 28 is preferably made hollow and is provided with a plurality of circumferentially-spaced compartments 52 over the entire rotor interior. As shown in FIGS. 2 and 3, the rotor hub portion terminates short of the rotor end walls and an annular gap or opening 54 is formed at each end of the rotor hub for allowing a coolant to flow in and out of the rotor compartments 52. During rotation of the shaft 20 with its eccentric portion 22, the bearings 24, 26 and 30 will become periodically unloaded and a coolant, or lubricating oil in this case, will flow between the bearings and the shaft and some of this oil will collect in an annular cavity region between the end walls 14 and 16 and the rotor hub portion. Thus, it will be seen that the lubricating oil is provided for lubricating the bearing surfaces and for cooling the interior of the rotor. Reference may be made to United States Patent No. 3,176,915 issued on Apr. 6, 1965, for a more detailed description of the oil circulation for lubricating and cooling, which in itself forms no part of the present invention.

It will be apparent that, during operation of the engine, a substantial quantity of oil will collect in the annular cavity region on each side of the rotor between the rotor end faces and the adjacent outer body end walls 14 and 16. In order to prevent the oil from passing between the rotor end walls and the respective adjacent inner faces of the housing end walls and ultimately into the working chambers 34 where the oil may mix with gases for combustion, oil seal means are provided for minimizing the leakage of oil into the working chambers 34, as will be explained in greater detail hereinafter. In order to remove the oil from the engine after circulation through the interior of the rotor, a bore 56 (FIGS. 3 and 4) is provided in each end wall 14 and 16, respectively, which bore 56 communicates with an annular collection cavity 58 in each end wall 14 and 16, respectively, which cavity 58 may have suitable drainage passageways (not shown) connected thereto for removing the oil from the engine for recirculation therethrough after suitable cooling and filtering.

Figure 4:
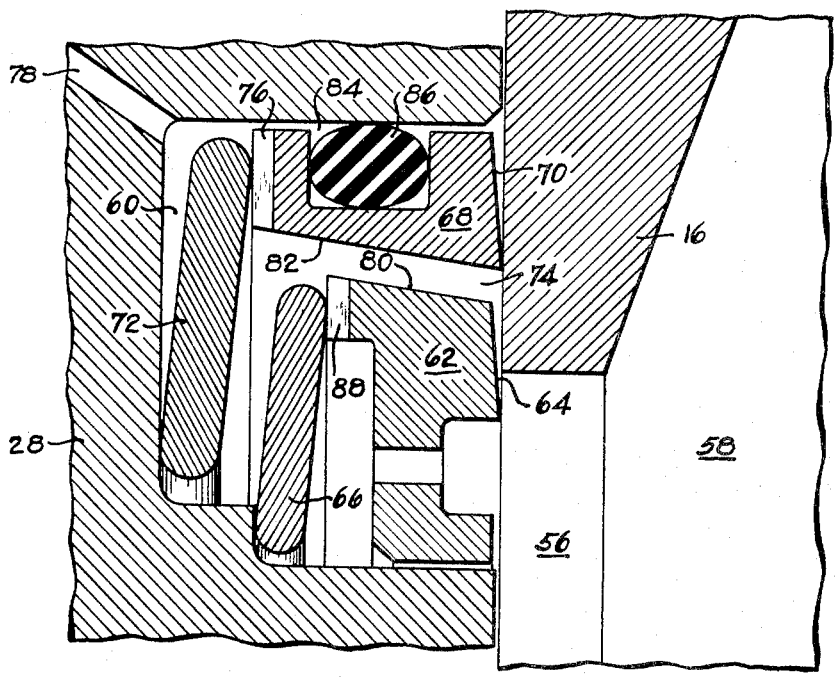
FIG. 4 is an enlarged partial sectional view showing the oil seal construction in its oil seal groove.
Figure 5:
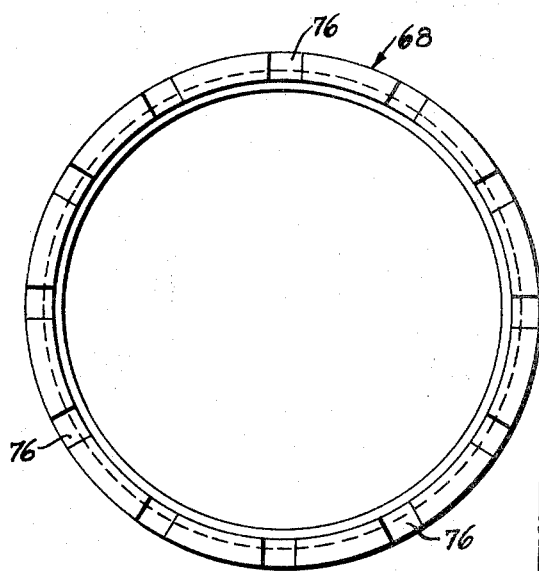
FIG. 5 is a plan view of one of the oil seal rings of the invention.
Figure 5A:
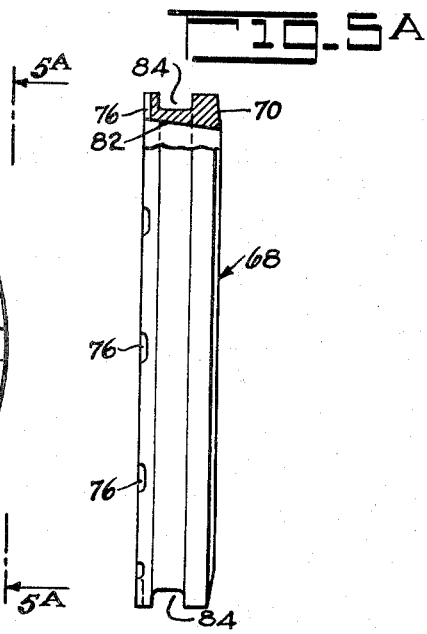
FIG. 5A is an end view of the oil seal ring of FIG. 5 taken in the direction of line 5A—5A.

As stated above, it is a primary object of the invention to provide an improved oil sealing construction for minimizing oil consumption particularly in rotary combustion engines. Referring particularly to FIGS. 2, 3 and 4, there is shown therein a preferred embodiment of the invention. It can be seen therein that an oil seal groove 60 is provided in each end wall of the rotor 28 or in an adapter ring carried by each end wall, as shown in FIGS. 2 and 3, which is merely a continuation of the end wall itself and both constructions will hereinafter be referred to as the end wall. The oil seal grooves 60 are located adjacent to the inner periphery of the rotor end walls and are disposed for carrying suitable seal means for sealing engagement with the facing surfaces of the outer body end walls 14 and 16. A first oil seal ring member 62 is disposed in the radially inner portion of each oil seal groove 60 and is provided with a scraping edge contact surface 64 which is disposed in sealing engagement with the inner surface of an end wall of the outer body. The first oil seal ring 62 is biased into engagement with an outer body end wall by a Belleville spring 66, supported coaxially with the rotor 28, which provides an axially directed spring force against the oil seal ring 62 for maintaining sealing engagement between the oil seal ring and the outer body end wall. The Belleville spring 66 is in substantially continuous engagement with the axial inner surface of the seal ring 62 at the point of contact.

Radially spaced from the oil seal ring 62 is a second oil seal ring 68 in the oil seal groove 60 which also has a scraping edge sealing contact with an outer body end wall through its seal face 70. The angle of the scraping edge surface of the seal rings 62 and 68 relative to the outer body end wall preferably ranges from 3 degrees to 9 degrees depending upon the efficiency desired for preventing leakage past the oil seal ring, as will be more clearly explained hereinafter. The oil seal ring 68 is biased by an axial spring force from a coaxially disposed Belleville spring 72 into sealing engagement with the inner surface of an outer body end wall adjacent thereto substantially in the same manner as the oil ring 62. The Belleville spring 72 acting on the oil seal ring 68 is preferably a stronger spring than the spring 66 biasing the seal ring 62 to provide a greater biasing force on the oil seal ring 68. This is so because it is desirable to minimize the friction drag on the first oil seal ring 62 while still maintaining sufficient force to provide initial sealing through the oil seal 62. However, the spring force from the spring 72 must be sufficient to minimize any oil leakage radially past the oil ring 68 of the oil which may pass between the oil seal ring 62 and the adjacent face of an outer body end wall such as that shown at 16 in FIG. 4. Further, the stronger spring force acting against the oil seal ring 68 also serves to position the rotor relative to the end walls and minimizes relative axial movement of the rotor.

As clearly shown in FIG. 4, the first oil seal ring 62 is disposed so that at times, during planetary motion of the rotor relative to the outer body axis, the scraping edge 64 of the oil seal ring 62 will be disposed radially inwardly of the outer dimension of the bore 56 in the outer body end wall. During such time the space 74 between the oil rings 62 and 68 will communicate with the bore 56 and the oil collection cavity 58. At such time as this occurs during the motion of the rotor, the acceleration forces generated during movement of the rotor will be directed radially inwardly on the portion of the rotor illustrated in FIG. 4 so that the oil which may have passed radially outwardly of the oil seal 62 and into the space 74 will be drained radially inwardly from the space 74 into the bore 56 and into the collection cavity 58. Reference may be made to aforementioned United States Patent No. 3,176,915, issued Apr. 6, 1965, for a more detailed description of the acceleration forces acting on the rotor and the oil traveling therewith and also to United States Patent No. 3,171,590, issued Mar. 2, 1965, for a more detailed description of the drainage of the oil from the oil seal groove due to the acceleration forces.

The space 74 between the oil seal rings 62 and 68 communicates with the oil collection cavity 58 during only a small portion of the rotation of the rotor. During portions of rotor rotation wherein the acceleration forces are directed radially outwardly, the oil may be drained from the space 74 and the groove 60 by means of recesses 76 provided in the rear face of the oil seal ring 68 to permit the oil to flow behind the oil seal ring 68 wherein the oil may be drained from the oil seal groove 60 through openings or passageways 78 provided in the rotor end wall which passageways 78 communicate with the compartments 52 in the rotor interior. It will be further seen that the facing surfaces 80 and 82 of the oil seal rings 62 and 68, respectively, are inclined toward the radially outer portion of the oil seal groove 60 in the direction of the passageways 78 so that when the acceleration forces are directed radially outwardly, the inclined surfaces 80 and 82 will facilitate the flow of oil toward the recesses 76 in the oil seal ring 68 for flow out through the openings 78 into the compartments 52. It will be apparent therefore that means are provided for draining oil from the oil seal groove which oil may have leaked past the oil seal ring 62 so that the pressure build-up of the oil does not become such that leakage will occur past the oil seal ring 68. By positioning the inner oil seal ring 62 such that it communicates with the bore 56 in the outer body end wall and by providing recesses 76 in the rear of the oil seal ring 68 and making use of the acceleration forces as a means for pumping the oil in a desired direction, the oil build-up in the oil seal groove 60 can be substantially accurately controlled whereby substantially no leakage occurs radially outwardly of the oil seals in the direction of the working chambers.

In order to prevent leakage of oil from the oil seal groove 60 between the radially outer peripheral surface of the oil seal 68 and the radially outer surface of the oil seal groove 60, the oil seal ring 68 is provided with a groove 84 in its outer peripheral surface and an O-ring 86 is disposed in said groove 84 for sealing engagement between the walls of the oil seal groove 84 and the radially outer wall of the oil seal groove 60. Obviously, however, the O-ring 86 may be disposed in a groove in the rotor end wall for sealing engagement with seal ring 68. The O-ring 86 therefore eliminates any leakage from behind and around the oil seal ring 68 such as from oil passing through the recesses 76. It will be apparent that the oil seal ring 62, with its Belleville spring 66 providing an axial spring force on the rear side thereof, provides an initial sealing for preventing oil leakage in a direction toward the working chambers. The oil seal ring 68 with its Belleville spring 72 provides a back-up sealing to the oil seal ring 62 with the spring 72 providing an even greater spring force than the spring 66 for the oil seal ring 62. The oil seal ring 68 with its O-ring 86 provides a final sealing for the oil seal groove 60 which consistently results in substantially no oil leakage past the oil seal construction including the two oil seal rings 62, 68 and the O-ring 86 with the associated Belleville springs 66 and 72 at low to moderate speed ranges and relatively immeasurable leakage at relatively high speed ranges. The means described above for draining the oil seal groove of oil during the changing of acceleration forces generated during rotor rotation reduces the possibility of overloading the oil seal rings by maintaining a minimum amount of oil in the oil seal groove.

As explained in United States Patent No. 3,180,563, issued on Apr. 27, 1965, the use of Belleville springs with a scraping type seal ring such as that illustrated in FIG. 4 has particular advantages in this type of construction. As explained in said patent, the axial spring force of the Belleville springs can readily be determined so that the springs can be advantageously oriented to provide maximum effect of their spring force for biasing the seals into sealing contact. As is known in this type of construction, the oil seals are subject not only to rotary motion of the rotor but to its planetary motion relative to the outer body axis so that the seals are subject to friction forces which tend to move them in different directions during the complex motion of the rotor. The Belleville spring with its substantial axial force on the oil seal rings provides for a relatively simple method of providing a force which will maintain the seal rings substantially in scraping edge contact during the complex motion of the rotor. Further, as also explained in the aforementioned patent, the Belleville-type springs effectively utilize a relatively higher percentage of the volume of spring material for doing spring work than other forms of springs such as coil or wavetype springs. Thus, it is possible to get more effective work per unit volume of spring material out of a Belleville spring than other types of springs which is particularly advantageous in construction such as rotary combustion engines in that it is desirable to make the oil seal grooves with as small an area as possible.

It is desirable in some applications of rotary mechanism to permit a slight amount of controlled leakage of oil between the rotor and outer body end walls in the direction of the working chambers for providing a thin film of lubrication between said rotor and the outer body end walls so that the rubbing contact of the rotor and the outer body end wall faces will be minimized. Also, it may be desirable to permit a slight amount of oil leakage in the direction of the working chambers to provide a small amount of lubrication between the apex seal members and the inner surface of the peripheral wall. However, at the same time, it is not desirable to permit this leakage to become excessive due to the increase in oil consumption and the tendency towards fouling of combustion. It will be readily understood that, if such leakage is permitted, it must be controlled so as not to become excessive. The invention defined herein provides for a means to permit a controlled amount of leakage of oil to accomplish the aforementioned purposes.

Referring again to FIG. 4, it will be seen therein that the oil seal ring 62 is preferably provided with a plurality of relatively small recesses 88 in the rear portion thereof, there being twelve such recesses illustrated in FIG. 6, although the invention is not limited to this particular member. The recesses 88 in the oil seal ring 62 permit a small amount of leakage of oil from behind the oil seal ring 62 which oil may flow into the oil seal groove between the radially inner surface of the oil seal ring 62 and the inner peripheral surface of the groove 60. This leakage may flow behind the oil seal ring 62 through the recesses 88 and into the space 74 defined between the oil seal ring 62 and the oil seal ring 68. As the oil collects in the space 74, there will be a slight overloading of the oil seal ring 68 so that during movement of the oil seal ring 68 in the groove 60 small amounts of oil may periodically squirt past the scraping edge surface 70 and flow radially outwardly between the rotor and the end walls of the outer body.

It will be apparent, however, that by varying the number of recesses in the oil seal ring 62, the amount of oil which may leak into the space 74 from behind said oil ring 62 can be controlled. Thus, the leakage through the recesses 88 can be varied from substantially no oil leaking from behind oil ring 62 to a maximum amount desirable for providing sufficient lubrication between the rotor and outer body radially outward of the oil seal construction. Other means may be provided in order to supply a controlled amount of leakage of oil such as varying the size of the recesess in the oil seal ring 62, varying the overlap of the oil seal ring 62 with the bore 56 in the outer body end wall, varying the edge contact of the seals 62 and 68 or by controlling the drainage of oil from the oil seal groove 60 through a varying of the size or the number of holes 78 connecting the oil seal groove to the compartments 52 in the interior of the rotor. It is also within the scope of the invention to control the leakage past the oil seal ring 68 by varying the number or area of the recesses in the seal ring 68, thus reducing the flow out of the oil seal groove 60 through the holes 78. Further, by varying the angle of the scraping edge of the seal rings, particularly seal ring 68, between, for example, a range of three degrees and nine degrees, the sealing contact can be slightly varied, so that the leakage can be varied as a function of the angle of the sealing surface with the outer body end wall. It has been found that by varying this angle, the periodic leakage past the seal can also be varied in accordance with the change in angle.

Referring to FIG. 7, there is shown therein another embodiment of the invention with like elements having like numerals. As shown in FIG. 7, the radially inner sealing element 62 and its Belleville spring 66 have been eliminated. This configuration is particularly applicable when it is desired to permit more oil flow past the oil seal means for providing more lubrication between the rotor end wall and the outer body end wall, and between the apex seals and the outer body peripheral wall. Also, in smaller engines or when space requirements demand a smaller oil seal groove, the configuration of FIG. 7 is very useful since substantially less space is required for this configuration than for the configuration of FIGS. 1–6.

The seal groove space below or radially inwardly of the seal member 68 is disposed in the rotor end wall so that, as in the first embodiment, this space will periodically communicate with the bore 56 and collection cavity 58 for draining said seal groove 60. Drain holes 78 are also provided for draining the seal groove 60 by pumping action along the inclined surface 82 of seal member 68 and through recesses 76 when the acceleration forces are acting in a radially outward direction. Although the sealing efficiency of the embodiment of FIG. 7 will not be as high as that of the embodiment of FIGS. 1–6 due to the elimination of the seal member 62, the sealing efficiency can be increased relative to the embodiment of FIGS. 1–6 by increasing the force of spring 72 and through variation of the angle of the seal face 70. Therefore, through the periodic draining of the seal groove 60 and by varying the components of sealing structure, the oil leakage may be somewhat greater than that in the configuration of FIGS. 1–6 but will not be excessive. Thus, the embodiment of FIG. 7 also provides a sealing configuration wherein the sealing is controlled in accordance with lubrication requirements and oil consumption requirements.

The above-detailed description specifically describes a construction through which oil leakage in rotary mechanisms of the type described herein may be kept at a minimum. It has been found that the sealing of the sealing constructions described herein operates with relatively high efficiency which, in the case of the embodiment of FIGS. 1–6, where no deliberate oil leakage means are provided, has consistently provided no oil leakage at low and moderate speed ranges and relatively immeasurable leakage at high speed ranges. The invention also describes means for providing a controlled amount of leakage past the oil seal construction of the invention in order to permit lubrication in desired areas beyond the oil seal construction. It is considerered that the construction described herein is a significant advance in the rotary combustion engine art, which for the first time provides an oil sealing construction which is capable of preventing undue or excessive oil leakage in engines of this type.

While the invention has been specifically set forth in detail in its preferred embodiment in the above description, it should be understood that it is intended that the invention is not to be so limited thereby and it will be obvious to those skilled in the art that various changes and modifications may be made without departing from the spirit and scope of the invention. It is intended to cover all such modifications in the appended claims.

What is claimed is:

1. An oil seal construction for sealing between an outer body and a piston movable relative to said outer body; said oil seal construction comprising an oil seal groove disposed in an end wall of said piston and coaxial therewith; a first oil seal ring disposed in a radially inner portion of said oil seal groove with said first oil seal ring being in sealing contact with an adjacent outer body wall; a second oil seal ring disposed in a radially outer portion of said oil seal groove and spaced radially outwardly from said first oil seal ring, said second oil seal ring also being in sealing contact with the adjacent outer body wall; an annular Belleville-type spring means for each of said first and second oil seal rings with each said Belleville-type spring means being disposed in said oil seal groove for providing an axially directed spring force component against its associated seal ring in the direction of the adjacent outer body wall; and means for at least periodically draining the space between said first and second oil seal rings during relative rotation of said piston such that oil leakage between said piston and said outer body wall radially outward of said oil seal groove is minimized.

2. An oil seal construction as recited in claim 1 further comprising means for providing a controlled supply of oil radially outwardly past the sealing faces of said first and second oil seal rings to provide a lubricant film between said piston and the adjacent outer body wall radially outwardly of said first and second oil seal rings.

3. An oil seal construction as recited in claim 2 wherein said means for providing a controlled supply of oil radially outwardly past the sealing faces of said first and second oil seal rings comprises means for periodically overloading said second oil ring by centrifugal oil pressure such that relatively small spurts of oil may flow radially outwardly past said second oil seal ring.

4. An oil seal construction as recited in claim 2 wherein said means for providing a controlled supply of oil radially outwardly of the sealing faces of said first and second oil seal rings includes a plurality of recesses provided between the axially inner face of said first oil seal ring and the adjacent face of its associated Belleville-type spring means so that oil may flow behind said first oil seal ring into the space between said first and second oil seal rings whereby said second oil seal ring will become periodically overloaded by centrifugal oil pressure to permit relatively small spurts of oil radially outwardly of said second oil seal ring.

5. An oil seal construction as recited in claim 1 wherein said piston has a substantially hollow interior and said means for at least periodically draining the space between said first and second oil seal rings comprises a plurality of passageways provided in said piston with said passageways operably connecting said oil seal groove to said piston interior such that during movement of said piston relative to said outer body said oil seal groove will be at least periodically drained into said piston interior.

6. An oil seal construction as recited in claim 5 wherein the radially outer surface of said first oil seal ring and the radially inner surface of said second oil seal ring are inclined toward an associated passageway for conducting oil in the space between said first and second oil seal rings toward said passageway into the piston.

7. An oil seal construction as recited in claim 5 wherein said second oil seal ring is provided with a plurality of recesses in its axially inner face adjacent to its associated Belleville-type spring so that oil may flow behind said second oil seal ring into an associated passageway into the piston.

8. An oil seal construction as recited in claim 1 wherein said means for at least periodically draining the space between said first and second oil seal rings comprises an annular oil collection cavity in said outer body wall coaxial with said wall, and said second oil seal is disposed for continuous sealing engagement with the adjacent outer body wall and said first oil seal ring is disposed such that a portion of its sealing surface will at least periodically be disposed radially inwardly of the radially outer edge of said annular oil collection cavity such that the space between said first and second oil seal rings adjacent said portion of said first oil seal ring will be at least periodically in communication with said annular oil collection cavity for draining said oil seal groove into said annular oil collection cavity during movement of said piston relative to said outer body.

9. An oil seal construction as recited in claim 1 further comprising a resilient third oil seal ring disposed in sealing engagement with the radially outer surface of said oil seal groove and the radially outer surface of said second oil seal ring.

10. An oil seal construction as recited in claim 1 wherein said annular Belleville-type spring means for said second oil seal ring has a relatively greater spring force than the annular Belleville-type spring means for said first oil seal ring.

11. An oil seal construction for sealing between an outer body and a substantially hollow piston movable relative to said outer body, said oil seal construction comprising: at least one oil seal groove disposed in an end wall of said piston coaxially therewith, passage means in said piston wall with said passage means communicating with said oil seal groove and the substantially hollow interior of said piston, at least one oil seal ring member disposed in said oil seal groove and having an axially outward surface in substantially scraping edge sealing contact with an adjacent wall of said outer body, annular Belleville spring means disposed in said oil seal groove and in substantially continuous engagement with a wall of said groove and the axially inward surface of said oil seal ring member, and said oil seal ring member being provided with a plurality of cut-out portions in said surface adjacent to said annular Belleville spring member with said cut-out portions being in operative communication with said passage means so that during relative movement between said piston and said outer body said oil seal groove will be at least periodically drained into the hollow interior of said piston through said cut-out portions and said passage means.

12. An oil seal construction as recited in claim 11 wherein said oil seal ring member is disposed adjacent to the radially outer portion of said oil seal groove and the radially inner surface of said oil seal member is inclined in a direction toward said cut-out portions and said passage means.

13. An oil seal construction as recited in claim 11 further comprising a resilient second seal member disposed in said oil seal groove for sealing engagement between the radially outer surface of said oil seal ring member and the wall of said oil seal groove adjacent to said radially outer surface of said oil seal ring member.

References Cited

UNITED STATES PATENTS

| | | | |
|---|---|---|---|
| 3,171,590 | 3/1965 | Bentele et al. | 230—207 |
| 3,176,910 | 4/1965 | Bentele | 230—145 |
| 3,176,915 | 4/1965 | Bentele et al. | 230—145 X |
| 3,180,563 | 4/1965 | Jones et al. | 123—8 X |
| 3,196,849 | 7/1965 | Paschke | 123—8 |
| 3,206,109 | 9/1965 | Paschke | 230—145 X |
| 3,321,128 | 5/1967 | Fezer et al. | 277—81 X |

FOREIGN PATENTS 1,151,993   7/1963   Germany.

LAVERNE D. GEIGER, *Primary Examiner.*

J. MEDNICK, *Assistant Examiner.*